(No Model.) 2 Sheets—Sheet 1.

R. P. GARSED.
BUFFER.

No. 318,463. Patented May 26, 1885.

WITNESSES:
Joel M. DeVictor
J. H. Wilson

INVENTOR
R. P. Garsed (No Model.)
2 Sheets—Sheet 2.

R. P. GARSED.
BUFFER.

No. 318,463. Patented May 26, 1885.

WITNESSES
Joel H. DeVictor
J. H. Wilson

INVENTOR
R. P. Garsed

UNITED STATES PATENT OFFICE.

ROBERT P. GARSED, OF NORRISTOWN, PENNSYLVANIA.

BUFFER.

SPECIFICATION forming part of Letters Patent No. 318,463, dated May 26, 1885.

Application filed March 17, 1885. (No model.)

*To all whom it may concern:*

Be it known that I, ROBERT P. GARSED, a citizen of the United States, and a resident of Norristown, Montgomery county, and State of Pennsylvania, have invented a new and useful Improvement in Buffers, of which the following is a specification.

The object of my invention is to furnish an improved and reliable buffer for operation at the terminus of railways in arresting motion of a moving train; and it relates more particularly to mechanism by which the device is operated to its first position.

Figure 1:
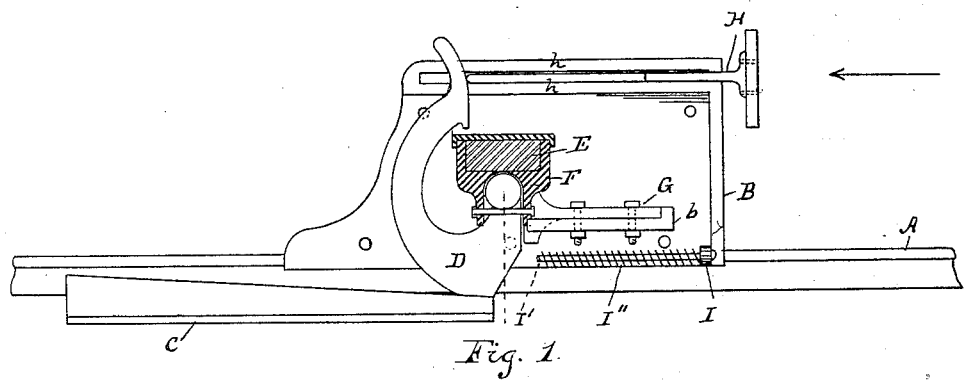
Figure 2:
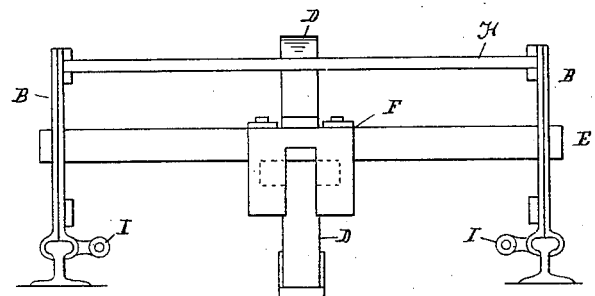
Figure 10:
Figure 3:
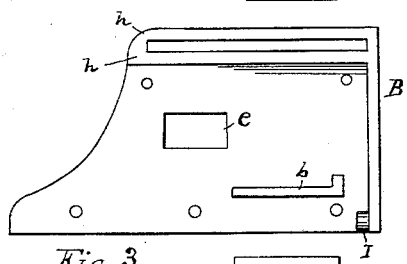
Figure 5:
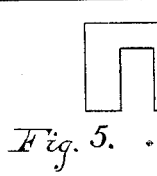
Figure 6:
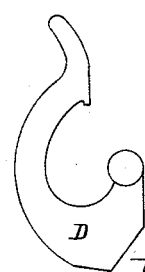
Figure 4:
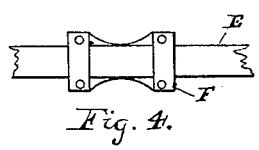
Figure 7:
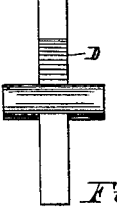
Figure 8:
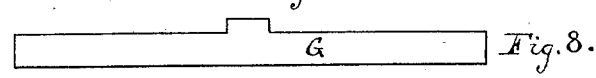
Figure 9:
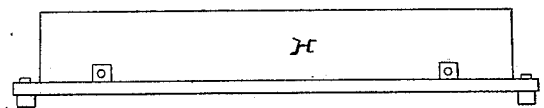
Figure 11:
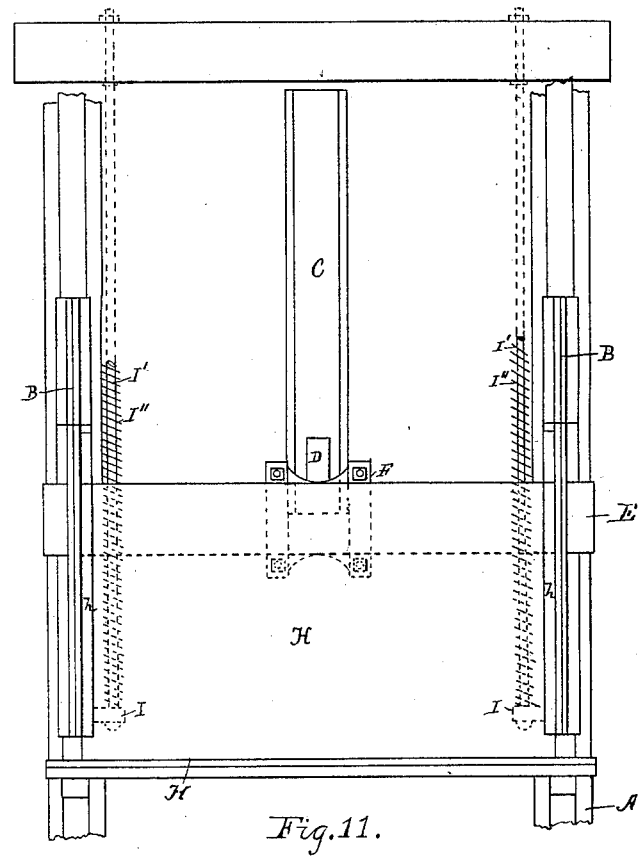
Figure 12:
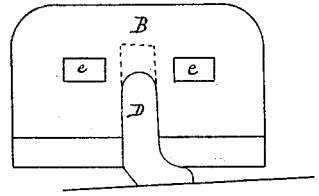
Figure 14:
Figure 13:
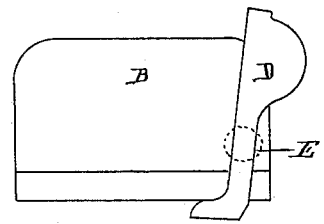
Figure 15:
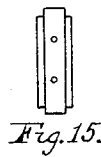
Figure 16:
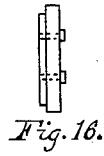

In the accompanying drawings, forming part of this specification, and in which similar letters of reference indicate like parts throughout the several views, Figure 1 is a sectional side view of a form of the device; Fig. 2, a rear view of the same; Fig. 3, an inside view of the supporting projections; Fig. 4, a top view of the cross friction-bar with journal-box; Fig. 5, a rear view of the journal-box; Fig. 6, a side view of a cam; Fig. 7, a rear view of the same; Fig. 8, a top view of a fixed supporting-bar for rear of lower part of cam shown in Fig. 1; Fig. 9, a top view of a sliding bar for pressing against top of cam, as shown in Fig. 1; Fig. 10, a side view of cam with a rear projection; Fig. 11, a plan view of the buffer; Fig. 12, a view of a supporting projection with two cross friction-bars, with top of cam projecting between them; Fig. 13, a modification of the device, in which bar E is pivoted to projections B, and cam D, being rigid with said bar, is operated by train abutting against the upwardly-projecting lever of bar E, as shown; Fig. 14, a view of a form of end of spring-rod I', which may be fastened to the sleepers of road in cases where a long spring-rod is necessary; Fig. 15, a view of the arm of sliding bar H and a rubber or wooden fender, which can move vertically; Fig. 16, a side view, and Fig. 17 a back view. Another of these arms may be put at the center of bar H to engage the nose of pilot.

A represents one of the tracks of a railroad.

B is a supporting projection adapted to slide thereon.

C is an inclined-faced friction-bar, situated between and running parallel with the tracks A.

D is a cam journaled beneath a friction-bar, E, which bar is supported at its ends through openings e in the supporting projections B, these ends of bar E moving inwardly when the center of the bar is raised.

F is a journal-box clamped to the bar E and holds cam D in position.

G is a cross-bar fastened at its ends to projections B, and at its center bears against cam D and keeps it from tripping backward upon the forward movement of projections B, the cam being allowed to raise and lower with bar E.

H is a sliding bar supported at its ends by ribs $h\ h$ on the projections B, and at its inner face is adapted to bear against top of cam D to hold it in place when desired.

I are lugs fastened to projections B and support spring-rods I' for the springs I'', used in returning the device to its normal position.

The rear of journal-box is left partly open or slotted to allow nose of bar G to bear against cam D in keeping the same in a perpendicular position upon advance of projections B. On the inside faces of these projections are shouldered ribs $b$, to which bar G at its ends is bolted. Journal-box F is held to bar E by cross-plates suited for being bolted, as shown in Fig. 4.

The operation of the device is as follows: A train comes in the direction of the arrow, Figs. 1 and 11, and the engaging part of train—such as platform of cars, cross-beam of locomotive, end of pilot, or the wheels or brake-shoes of the cars—abut against outer face or fenders of sliding bar H, which engages with projections B, whereupon these projections slide upon the rails A, with the effect that the cam D is moved upon the face of bar C and produces friction between itself and said bar, or between rails A and projections B, in proportion as said train advances, the train being thus stopped, without jarring, in a short space, the force of the blow being overcome, of course, by the strength of the parts of the apparatus, combined in a measure with the distance it slides, as may be illustrated in the case of a nail being struck by a hammer. The advance of the nail (in wood or other yielding substance) prevents jarring to the hammer. Upon the withdrawal of train, the inner face of bar H, ceasing to bear against top end of cam D, the heel of the cam, where it bears upon bar C, trips forward, this tripping being caused by tensional pressure of bar E upon the journals of cam, which has occurred during the advance of the device, whereupon the device, by springs I'', is returned to its first position, these springs being collapsed as the projections B move forward.

The heel of cam being best cut to a point forward of the line from center of its journals, as shown by dotted line in Fig. 1, will insure its prompt tripping when desired.

Figure 17:

The mechanism shown in Figs. 15, 16, and 17 consists of a metal shoe adapted to receive a suitably-shaped piece of rubber or wood, which is held by bolts through the slot, as shown, and thus allowed to move in a direction that the force of train may cause.

If desirable, a roller may be placed beneath heel of cam D.

If the projections B fit too loosely on rails A, iron plates with upturned ends may be put between them. The upturned ends, being outside, will serve to keep the plates in place. Also, cam D may be made to trip back, up, or down.

Having thus described my invention, what I claim, and desire to secure by Letters Patent, is—

1. In combination, the projections B, with a bar, E, supported thereby, and a cam, D, with sliding bar H, so arranged that upon their advance cam D is held in a position by said bar H to cause friction, substantially as and for the purposes set forth.

2. In combination, the projections B, with spring-lugs fastened thereto and adapted to slide upon rails A, the springs I'' and friction-bars E and C with said rails A, substantially as and for the purposes set forth.

3. In combination, the sliding supporting projections B, friction-bar E, and cam D, with bar G, so supported that it braces cam D in position upon its operation, substantially as and for the purposes set forth.

4. In combination, the sliding supporting projections B, with friction-bar E, supported thereby, cam D, with journal-box F, attached to bar E, and adapted to hold the cam and allow of its movements upon the advance and retreat of the buffer upon the rails A and said rails, substantially as and for the purposes set forth.

R. P. GARSED.

Witnesses:
JOEL H. DeVICTOR,
J. H. WILSON.